Patented June 15, 1948

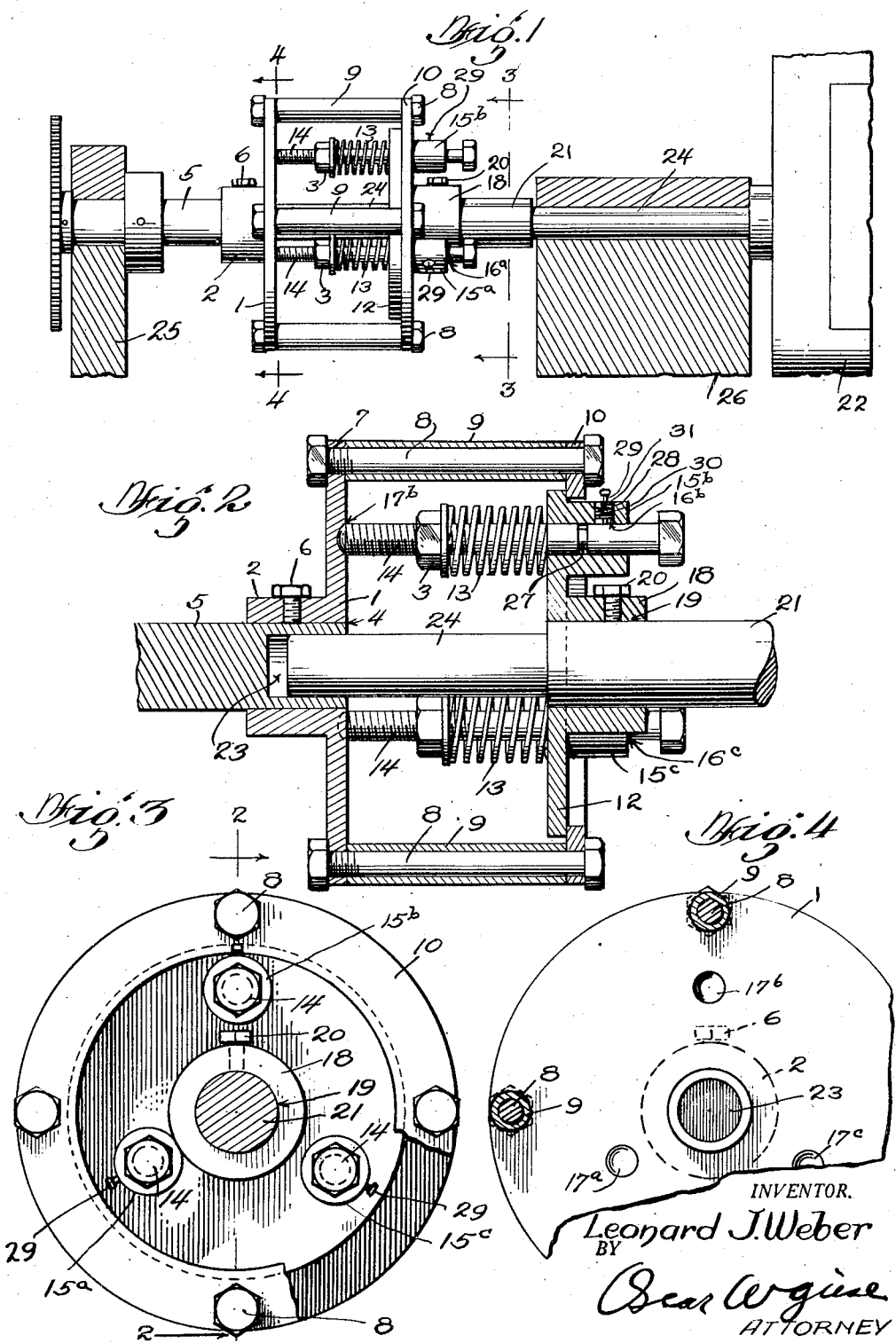

2,443,213

UNITED STATES PATENT OFFICE 2,443,213

SAFETY CLUTCH

Leonard J. Weber, United States Army,
Jersey City, N. J.

Application June 16, 1944, Serial No. 540,653

1 Claim. (Cl. 64—29)

(Granted under the act of March 3, 1883, as
amended April 30, 1928; 370 O. G. 757)

The invention described herein, if patented, may be manufactured and used by or for the Government for governmental purposes, without payment to me of any royalty thereon.

This invention relates to safety clutches, and more particularly to a safety slip clutch for connecting a driving member with a driven member in timed relation, and means for clutching said members together in such manner that in the event an excessive load is imposed on the driven member, the members are automatically disconnected, and can be re-engaged only in the same relationship existent when disconnected. The clutch is capable, therefore, of insuring the proper timing relationship between the two members, as well as avoiding damage to equipment or injury to personnel.

The specific form of clutch here shown relates primarily to one particularly adapted for use in a bakery loading drum mechanism which feeds dough from a "rounder" to the pockets of an "intermediate proofer." This mechanism is intermittently driven to provide a definite number of hesitation periods per revolution of the drive shaft for the purpose of discharging dough, and the invention provides means whereby the driving and driven components may be operably connected only when a predetermined angular relationship exists therebetween.

The specific problem confronting the industry, and solved by this invention is to provide an automatic disengageable clutch in a mechanism wherein a loading drum feeds dough into a series of pockets in the proofer and each pocket consisting of four compartments.

The complete mechanism is driven and timed to provide a hesitation period at each quarter revolution, and during such periods dough is automatically loaded onto the drum and discharged into the compartments.

An object of this invention is to provide a mechanism that may be installed at low cost in operable relation with any driving member, where it is desired to interpose a safety clutch between the driving member and a driven member to prevent damage to equipment or injury to personnel.

A further object of this invention is to provide a safety clutch mechanism that may be interposed between a driving member and a driven member, the clutching components being automatically releasable on overloading, and which can operably reengage only when a predetermined angular relation is established between the driving member and driven member.

A further object of this invention is to provide a simple, durable, inexpensive, and efficient safety clutch mechanism, wherein many of the parts are formed of stock materials and are relatively simple in construction. These components require only a minimum of machine work, and they can be readily constructed and expediently assembled at low cost by unskilled labor.

With the foregoing and other objects in view, which will appear as the description proceeds, the invention resides in the combination and arrangements of parts and in the details of construction hereinafter described and claimed. It is understood that various changes in form, proportions and minor details of construction may be made within the scope of the claim without departing from the spirit or sacrificing any advantages of the invention.

For a complete disclosure of the invention, a detailed description thereof will now be given in connection with the drawings forming a part of the specification, wherein:

Figure 1 is an elevational view showing the invention connected in operable relation with a driving member and a driven member, Figure 2 is a longitudinal sectional view taken on line 2—2 of Figure 3.

Figure 3 is a transverse sectional view taken on line 3—3 of Figure 1, and

Figure 4 is a transverse sectional view taken on line 4—4 of Figure 1.

In the drawings, wherein like members are given the same reference numbers, there is depicted an assembly consisting of an outer disk 1 made from suitable rigid materials, such as iron, steel, or the like, having integrally attached thereto a flange or sleeve 2. The sleeve has a concentric aperture 4 which accurately receives a drive shaft 5 which is rigidly secured thereto by a set screw 6, or other suitable means, such as welding, keying, or the like. Near the periphery of the disk 1, there are a plurality of apertures 7 having bolts 8 inserted therethrough to a rigid ring 10, of suitable material such as steel, iron or the like, and having apertures formed therein which are so spaced as to align with and accurately receive the bolts 8, thereby attaching the ring 10 to the disk 1, and holding it rigidly in spaced relation thereto by spacers 9 surrounding the bolts 8.

Between the outer disk 1 and the rigidly supported ring 10, there is interposed an inner disk 12 having a diameter larger than the inside diameter of the ring 10. On the face of this inner disk 12, 120 degrees apart and at unequal radii from the center, are three projections 15a, 15b, and 15c, having apertures 16a, 16b, and 16c therethrough. The reason for spacing the projections 15a, 15b and 15c and apertures 16a, 16b and 16c at unequal radii is for timing or registration purposes as will appear more clearly hereinafter. Bolts or plungers 14 are fitted in the apertures 16a, 16b, and 16c and they are freely movable therein. Surrounding the plungers 14 are yielding members 13, preferably in the form of coil springs, each spring having one point of compression directed against the face of the inner disk 12 and the other point of compression directed against the bolt nuts 3. On the inside face of the outer disk 1, there are shallow spherical recesses 17a, 17b and 17c which are axially aligned with the plungers 14 so that the rounded or spherical extremities of the plungers 14 are urged towards the recesses therein by the yielding member 13.

A driven shaft 21 having a "turned down" or reduced extremity 24 is inserted through an aperture 19 formed in the central flange or sleeve 18 of the inner disk 12, and the reduced extremity 24 is inserted into the recess 23 formed in the driving shaft 5, thereby insuring proper aligning of the clutch members. The inner disk 12 is secured to the driven shaft 21 by means of a set screw 20, or other suitable securing means.

In the operation of the invention, its utility in a relatively low geared mechanism employed in the bakery industry will be first disclosed. Under such conditions the driving shaft 5 is rotatably supported by a bearing block 25, and it is connected to an independent source of power having a timing device providing four hesitation periods per revolution of the shaft. The shaft 5 is connected through the interposed clutch mechanism to the driven shaft 21. The shaft 21 is rotatably supported in a bearing block 26, and it is connected to a loading drum 22 which functions to discharge dough into an "intermediate proofer," not shown, on each hesitation. Should any object, such as a hand brush or a man's arm, get caught in the drum 22, thereby placing an overload on the mechanism, the disk 1 and ring 10 will continue to turn with the driving shaft 5, whereas the inner disk 12, being attached to the driven shaft 21, will tend to stop, thereby forcing the plungers 14 out of the depressions 17. Due to the disclosed disposition of the plungers 14 and depressions 17, the clutch cannot be reengaged until the completion of one revolution of the driving shaft 5 relative to the driven shaft 21, at which time the depressions 17 are aligned with the respective plungers 14. In this relationship the spherical terminals of the bolts 14 are thrust by the force of the springs 13 into the recesses 17, thereby operably connecting the driving and driven components. In low geared equipment of this type, the time required for the drive shaft 5 to complete one revolution is ample to permit removal of the obstruction from the drum 22.

In a high geared mechanism, one revolution of the drive shaft 5 does not afford sufficient time for a person to remove an obstruction or extricate his arm from the drum 22. Optional means are provided, therefore, in the clutch when utilized with such high geared equipment. In order to hold the plungers 14 out of engagement with the depressions 17 after release therefrom, an annular recess 27 is formed in each of the plungers 14. In each projection 15a, 15b and 15c, there is formed an internally threaded aperture 28 which receives an assembly consisting of a pin 29 having flanges performing the function of a guide. A coil spring 30 surrounds the pin 29 and rests on the flanges, and an externally threaded plate 31 having a central hole to permit the pin 29 to protrude therethrough when the plate 31 is screwed into the aperture 28. When this assembly is employed, the pin 29 is urged against the plungers 14 by the spring 30, and, when the bolts 14 are forced back on releasing the clutch, the annular grooves 27 are aligned with the pins 29 which are urged therein to prevent further axial movement of the plungers 14. The driving members continue to rotate, whereas the driven members remain fixed. After the obstruction is removed from the drum, the pins 29 are pulled outwardly, thus permitting the plungers 14 to automatically move into their respective depressions 17 as soon as they are again aligned.

Having thus described the invention, what is claimed is:

In combination, a rotatable drive disk, a driven disk spaced from said drive disk and rotatable about the axis of said drive disk, a plurality of recesses on the inner face of one of said disks, a plurality of plungers carried on the other of said disks for engaging said recesses to form a driving connection between said disks, a coil spring associated with each plunger for urging each plunger to engage one of said recesses, one of said disks being of smaller diameter than the other of said disks, a ring engaging the outer face of the smaller disk, bolts interconnecting said ring with the larger of said disks for rotation therewith and providing access to said plungers and springs.

LEONARD J. WEBER.

REFERENCES CITED

The following references are of record in the file of this patent:

UNITED STATES PATENTS

| Number | Name | Date |
|---|---|---|
| 275,186 | Gass et al. | Apr. 3, 1883 |
| 533,394 | Mosher | Jan. 29, 1895 |
| 998,615 | Heneke | July 25, 1911 |
| 1,167,285 | Flogland | Jan. 4, 1916 |
| 2,148,481 | Le Frank | Feb. 25, 1939 |